United States Patent

Keller

[11] 3,944,854
[45] Mar. 16, 1976

[54] LIGHT-EMITTING DIODE CONNECTED TO A COIL

[75] Inventor: Hans Keller, Gundelfingen, Germany

[73] Assignee: ITT Industries, Inc., New York, N.Y.

[22] Filed: Dec. 5, 1974

[21] Appl. No.: 529,771

[30] Foreign Application Priority Data
Dec. 22, 1973  Germany............................ 2364301

[52] U.S. Cl. ................ 307/311; 250/552; 317/124; 331/113 R
[51] Int. Cl.² ........................................ H01L 33/00
[58] Field of Search ...................... 307/317 R, 311; 317/DIG. 6, 124; 331/113 R; 250/552

[56] References Cited
UNITED STATES PATENTS

| | | | |
|---|---|---|---|
| 2,907,929 | 10/1959 | Lawson, Jr. | 317/DIG. 6 |
| 3,755,697 | 8/1973 | Miller | 307/311 |
| 3,784,844 | 1/1974 | McGrogan, Jr. | 307/311 |

Primary Examiner—R. N. Envall, Jr.
Attorney, Agent, or Firm—John T. O'Halloran; Menotti J. Lombardi, Jr.; Vincent Ingrassia

[57] ABSTRACT

This relates to a light emitting diode circuit wherein a coil is connected to a voltage source, the voltage of which is lower than the threshold voltage of the forward diode characteristic. The light emitting diode is connected in series via the coil to the voltage source, and a transistor operating as a switch is connected in parallel to said light emitting diode.

9 Claims, 3 Drawing Figures

LIGHT-EMITTING DIODE CONNECTED TO A COIL

BACKGROUND OF THE INVENTION

This invention relates to a light-emitting diode circuit wherein a coil is connected to a voltage source, the voltage of which is lower than the threshold voltage of the forward diode characteristic.

Light-emitting diodes are preferably supplied with a restricted current. Usually, such diodes are operated from a source of voltage whose voltage is higher than the threshold voltage of the forward diode characteristic, i.e. the voltage at the knee (break point) of the current/voltage characteristic of the light-emitting diode. In the case of a gallium-arsenide-phosphide type of light-emitting diode, this voltage, as is well known, may amount to more than 1.6 V.

The German Published Patent Application (DOS) 2,255,822 discloses a circuit which is suitable for supplying a light-emitting diode also from a source of lower battery voltage with a restricted pulsating current utilizing the kick-back pulse of a coil connected thereto. In this case the light-emitting diode is connected in parallel with the coil. It is considered a disadvantage of this circuit, however, that the light-emitting diode is switched from the reverse into the forward direction with a relatively large voltage variation appearing at it, at the coil, and at the collector-emitter path of the switching transistor. This variation, in the case of a battery voltage of 1.35 V (mercury cell) amounts to about 3 V in cases where the forward threshold voltage of the light-emitting diode amounts to 1.65 V. The parasitic capacitances of the light-emitting diode, of the coil, and of the transistor must be charged and discharged by the amount of this voltage variation during each period of the switching frequency which, especially in the case of a high switching frequency, leads to additional losses. Moreover, minimum requirements must be placed on the reverse behavior of the light-emitting diode. Furthermore, it may be disadvantageous, under certain circumstances, for the light-emitting diode to be not connected on one side to reference potential.

The fact that the collector voltage of the switching transistor exceeds the battery voltage by the amount of the diode's forward threshold voltage (in the present case 1.65 V) may cause additional difficulties or at least an increased investment in cases where the switching transistor forms part of a monolithic integrated circuit with integrated devices being connected to its collector, and with the insulating islands thereof having to be connected to the positive pole of the source of supply voltage.

SUMMARY OF THE INVENTION

It is an object of the present invention to provide a light-emitting diode circuit which, with a coil, is connected to a voltage source whose voltage is lower than the forward threshold voltage of the light-emitting diode, and avoids the aforementioned disadvantages.

According to a broad aspect of the invention there is provided a light-emitting diode circuit comprising: a source of supply voltage having first and second poles; a coil having first and second terminals, said first terminal coupled to said first pole; a first transistor operated as a switch having a base, emitter and collector, said emitter coupled to said second pole and said collector coupled to said second terminal; and at least one light-emitting diode coupled in parallel across the collector-emitter path of said first transistor, said diode having a forward threshold voltage higher than the voltage of said source.

For controlling the luminous intensity it is favorable for the transistor to be controlled by a pulse generator. In this case, the transistor operated as the switch, and the coil preferably both form part of a pulse generator.

The above and other objects of the present invention will be more clearly understood from the following detailed description taken in conjunction with the accompanying drawings, in which:

BRIEF DESCRIPTION OF THE DRAWINGS

FIG. 3 shows a circuit according to the invention employing a plurality of light-emitting diodes capable of being optionally switched on.

DESCRIPTION OF THE PREFERRED EMBODIMENTS

Figure 1:
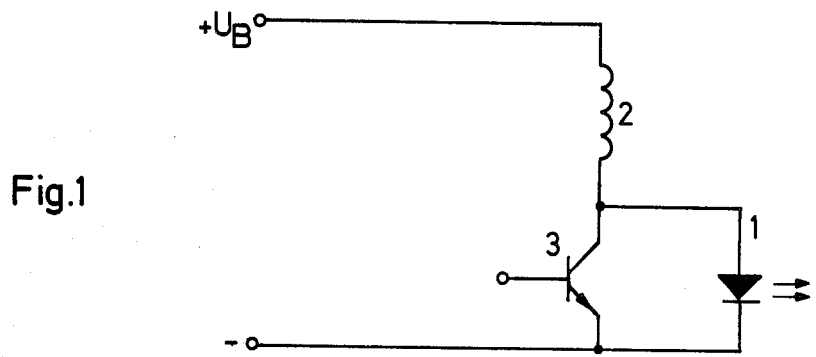
FIG. 1 is a schematic diagram of a first embodiment of the invention.

In the basic circuit according to FIG. 1 the light-emitting diode 1 is shown to be connected in series with the coil 2, and connected on one side to reference potential, so that the voltage $U_B$ is applied to the circuit. The light-emitting diode 1 is polarized in the forward direction, and is therefore not required to operate in the reverse direction. The collector-emitter path of transistor 3 which is to be operated as a switch, is arranged in parallel with the light-emitting diode 1. Under the aforementioned conditions, when using a gallium-arsenide-phosphide type of light-emitting diode, the voltage variation as occuring at the three devices shown in FIG. 1, only amounts to about 1.65 V, and the collector voltage of the switching transistor only exceeds the battery voltage by 0.3 V, hence by less than the forward threshold voltage of the pn-junction of an integrated circuit in a silicon semiconductor body. This offers the advantage that transistor 3, without further ado, may be designed to form part of a monolithic integrated circuit which may contain a pulse generator and, if so required, still further components.

Figure 2:
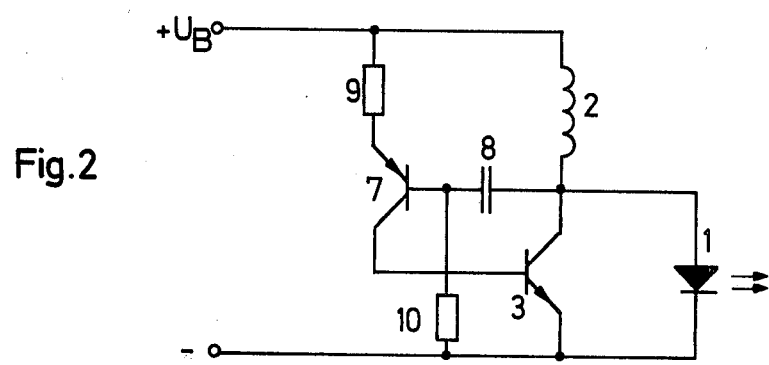
FIG. 2 is a schematic diagram of a second embodiment according to the invention.

In further embodying the basic circuit according to FIG. 1, the circuit according to FIG. 2 contains as the pulse generator an astable multivibrator. This multivibrator contains a further transistor 7 which is complementary to the transistor 3, as well as a charging capacitor 8, and two resistors 9 and 10. The base electrode of transistor 3 which is operated as a switch, receives the control signal from the collector of the additional transistor 7 whose emitter, across the resistor 9, is applied to the one terminal of the coil 2 whose other terminal, via the charging capacitor 8, is connected to the base terminal of the additional transistor 7. Moreover, the base terminal of the additional transistor 7, across the resistor 10, is applied to the other pole of the source of voltage. While the first terminal of the coil 2 is applied to the one pole of the source of voltage, its second terminal is connected to the collector of transistor 3.

Instead of an astable multivibrator it is also possible to use a blocking oscillator or any other conventional type of self-oscillating circuit which, just like the astable multivibrator according to FIG. 2, may be designed as a monolithic integrated circuit. In so doing, it may be advisable to couple a second coil, serving the feeback purpose, to the coil 2.

Owing to the already mentioned advantage of an easy integrability of the transistor 3 operated as a switch, a circujit according to the invention may be extended without further ado for generating a flashing light, in that the transistor 3 is controlled by a further pulse generator of a lower frequency, which is preferably designed to form part of a monolithic integrated circuit containing the transistor 3 operated as a switch.

Figure 3:
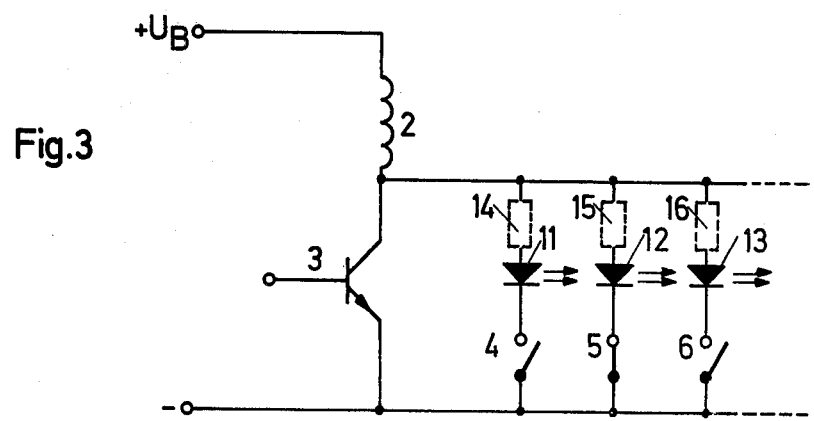

FIG. 3 relating to a further embodiment of the circuit according to the invention, contains several light-emitting diodes 11, 12 and 13. These diodes may each be connected across a series resistor 14, 15 or 16 as indicated by the broken line in FIG. 3. The switches 4, 5 and 6 which are arranged in series with the light-emitting diodes 11, 12 and 13 may be either mechanical or electronic switches.

When using n-light-emitting diodes 11, 12, 13 . . . in a circuit according to FIG. 3 it is desirable for the luminous intensity of the individual light-emitting diodes to be kept constant independently of the number of closed switches 4, 5, 6 . . . . For this purpose, and in accordance with a further embodiment of the circuit according to the invention, it is possible to take circuit steps and measures by which the pulse-interval ratio of the pulses controlling the transistor 3, can be affected in dependence upon the number of closed switches. Accordingly, any optional number of switchess 4, 5, 6 . . . can be closed without affecting the brightness of the individual light-emitting diodes 11, 12, 13 . . . .

While the principles of the invention have been described above in connection with specific apparatus, it is to be clearly understood that this description is made only by way of example and not as a limitation on the scope of the invention.

What is claimed is:

1. A light-emitting diode circuit comprising:
    means for applying a supply voltage having first and second poles;
    a coil having first and second terminals, said first terminal coupled to said first pole;
    a first transistor operated as a switch having a base, emitter and collector, said emitter coupled to said second pole and said collector coupled to said second terminal; and
    at least one light-emitting diode coupled in parallel across the collector-emitter path of said first transistor, said diode having a forward threshold voltage higher than said supply voltage.

2. A light-emitting diode circuit according to claim 1 further comprising a pulse generator coupled to said first transistor.

3. A light-emitting diode circuit according to claim 2 wherein said pulse generator is an astable multivibrator.

4. A light-emitting diode circuit according to claim 2 wherein said pulse generator is a blocking oscillator.

5. A light-emitting diode circuit according to claim 1 wherein a plurality of light-emitting diodes are coupled in parallel across the collector-emitter path of said first transistor.

6. A light-emitting diode circuit according to claim 5 wherein each of said plurality of light-emitting diodes is coupled in series with one of a plurality of resistors.

7. A light-emitting diode circuit according to claim 6 wherein each of said plurality of light-emitting diodes are coupled in series with one of a plurality of switches.

8. A light-emitting diode circuit according to claim 1 further comprising:
    an additional transistor having a base, emitter and collector, said collector coupled to the base of said first transistor;
    a capacitor coupled between the base of said additional transistor and the collector of said first transistor;
    a first resistor coupled between said first pole and the emitter of said additional transistor; and
    a second resistor coupled between the base of said additional transistor and said second pole.

9. A light-emitting diode circuit according to claim 8 wherein said additional transistor is of a conductivity type opposite to that of said first transistor.

* * * * *